United States Patent [19]

Aoyama et al.

[11] Patent Number: 5,360,865
[45] Date of Patent: Nov. 1, 1994

[54] GRAFTED IMPACT MODIFIERS OF $C_6$–$C_{10}$ ALKYLRYLATE RUBBER FOR POLYCARBONATE

[75] Inventors: Taizo Aoyama, Takasogo; Norio Nagata, Kakogawa; Kenzi Hosokawa, Takasago; Hideki Hosoi, Kobe, all of Japan

[73] Assignee: Kanegafuchi Kagaku Kogyo Kabushiki Kaisha, Osaka, Japan

[21] Appl. No.: 106,195

[22] Filed: Aug. 13, 1993

Related U.S. Application Data

[63] Continuation of Ser. No. 765,343, Sep. 25, 1991, abandoned.

[30] Foreign Application Priority Data

Sep. 26, 1990 [JP] Japan .................... 2-258599

[51] Int. Cl.⁵ ............................ C08L 69/00
[52] U.S. Cl. ...................... 525/67; 525/307; 525/309
[58] Field of Search ........................... 525/67

[56] References Cited

U.S. PATENT DOCUMENTS

| | | |
|---|---|---|
| 3,655,824 | 4/1972 | Kato et al. . |
| 4,108,923 | 8/1978 | Mast ..................... 525/307 |
| 4,378,449 | 3/1983 | Witman .................. 525/67 |
| 4,654,400 | 3/1987 | Lohmeijer ............... 525/67 |
| 4,957,677 | 9/1990 | Katoh .................. 526/329.5 |
| 5,187,227 | 2/1993 | Tera ..................... 525/67 |

FOREIGN PATENT DOCUMENTS

| | | |
|---|---|---|
| 0064692 | 11/1982 | European Pat. Off. . |
| 0186917 | 9/1986 | European Pat. Off. . |
| 0297517 | 4/1989 | European Pat. Off. . |
| 0362786 | 11/1990 | European Pat. Off. . |
| 38-15225 | 3/1961 | Japan . |
| 39-71 | 6/1961 | Japan . |
| 128746 | 10/1975 | Japan . |
| 001246 | 1/1978 | Japan . |

*Primary Examiner*—David Buttner
*Attorney, Agent, or Firm*—Armstrong, Westerman, Hattori, McLeland & Naughton

[57] ABSTRACT

A resin composition including (A) 50 to 99% by weight of polycarbonate and (B) 1 to 50% by weight of a graft-copolymer; the graft copolymer (B) prepared by graft-polymerizing a monomer mixture (2) containing mainly 40 to 100% by weight of a $C_1$ to $C_6$ alkyl acrylate onto a rubber polymer (1) prepared by copolymerizing 60 to 100% by weight of a $C_6$ to $C_{10}$ alkyl acrylate, and small amounts of a crosslinking compound and a graftlinking monomer. The resin composition is remarkably excellent in impact strength at low temperature as well as excellent in thermal stability and weatherability.

5 Claims, 2 Drawing Sheets

GRAFTED IMPACT MODIFIERS OF $C_6$–$C_{10}$ ALKYLRYLATE RUBBER FOR POLYCARBONATE

This application is a continuation of application Ser. No. 07/765,343 filed Sep. 25, 1991, now abandoned.

BACKGROUND OF THE INVENTION

The present invention relates to a resin composition, and more particularly to a resin composition comprising a polycarbonate resin and a graft-copolymer prepared by graft-polymerizing a monomer mixture onto a rubber polymer, which is excellent in thermal stability, weatherability and impact strength at a low temperature and suitable for use of outside parts for automobiles.

Recently, engineering plastics such as polycarbonate resins have been extensibly used for outside parts for automobiles. They have been required to have the excellent impact strength at a low temperature in a temperature range of −40° to −10° C., in addition to the excellent thermal stability on on-line coating and weatherability. The impact strength at low temperature is shown by a transition temperature from a ductile fracture region to a brittle fracture region (a brittle-ductile transition temperature, hereinafter referred to as "B-D transition temperature"). The lower the B-D transition temperature, the more excellent the impact strength at low temperature.

Although the polycarbonate resin is an engineering plastic having excellent impact strength, weatherability, machanical properties and physical properties, its B-D transition temperature is high compared to the abovementioned temperature range. Accordingly, the outside parts for automobiles prepared from the polycarbonate resin alone is insufficient in impact strength at low temperature.

Nevertheless, methods for improving the B-D transition temperature of the polycarbonate resins have hitherto been scarcely proposed, and some methods for improving the impact strength at room temperature or the processability, as mentioned below, have been merely proposed.

For instance, Japanese Examined Patent Publication No. 38-15225 proposes a method wherein an ABS resin prepared by graft-polymerizing styrene and acrylonitrile onto a butadiene rubber polymer is admixed with a polycarbonate resin. Also, Japanese Examined Patent Publication No. 39-71 proposes a method wherein an MBS resin prepared by graft-polymerizing methyl methacrylate and styrene onto a butadiene rubber polymer, which has hitherto been known as a reinforcement for vinyl chloride resins, is admixed with the polycarbonate resin.

The resin compositions according to the above-mentioned Japanese publications, however, have defects that the thermal stability and weatherability are poor, caused by, probably, the butadiene components.

On the other hand, Japanese Examined Patent Publication No. 48-29308 proposes that in order to improve the thermal stability and weatherability, a graft-copolymer using an alkyl acrylate polymer as a rubber component is admixed with the polycarbonate resin.

According to the above-mentioned method, as the alkyl acrylate, alkyl acrylates having an alkyl group with 5 or less carbon atoms, particularly n-butyl acrylate, are mainly used because they are cheap and can be easily handled. Although the above-mentioned composition can be improved in thermal stability and weatherability, it is higher in B-D transition temperature than the composition using the butadiene rubber polymer.

As mentioned above, a resin composition containing the graft-copolymer which is satisfactory in all of the thermal stability, the weatherability and the impact strength at low temperature showing by the B-D transition temperature cannot be obtained according to the conventional methods.

An object of the present invention is to provide a resin composition comprising mainly a polycarbonate resin which is excellent in all of the thermal stability, the weatherability and the impact strength at low temperature.

This and the other objects of the present invention will become apparent from the following description hereinafter.

SUMMARY OF THE INVENTION

It has now been found that when a graft-copolymer using a $C_6$ to $C_{10}$ alkyl acrylate polymer as a rubber component is admixed with a polycarbonate resin in a predetermined weight ratio, a resin composition having excellent impact strength at low temperature showing by the B-D transition temperature and having excellent properties can be obtained.

It has hitherto been known that a glass transition temperature of an alkyl acrylate homopolymer depends on the number of carbon atoms of the alkyl group in the alkyl acrylate, and that among homopolymers of an alkyl acrylate having an alkyl group with 6 or more carbon atoms, there are the acrylate homopolymers having a lower glass transition temperature than homopolymers of an alkyl acrylate having an alkyl group with 5 or less carbon atoms such as n-butyl acrylate (Polymer Handbook, 2, 1975).

However, there has been no attempt wherein the number of carbon atoms of an alkyl group in an alkyl ester used in a rubber polymer of the graft-copolymer is varied thereby improving a B-D transition temperature of a polycarbonate resin with which the graft-copolymer is mixed. Further, it has not been known that the B-D transition temperature is improved by particularly using a $C_6$ to $C_{10}$ alkyl acrylate.

In accordance with the present invention, there is provided a resin composition comprising:

(A) 50 to 99% by weight of a polycarbonate resin and
(B) 50 to 1% by weight of a graft-copolymer;
said graft-copolymer (B) comprising:
  (1) 50 to 85 parts by weight of a rubber polymer and
  (2) 50 to 15 parts by weight of a monomer mixture, the total amount of the components (1) and (2) being 100 parts by weight,
said rubber polymer (1) being prepared by copolymerizing
  (i) 60 to 100% by weight of an alkyl acrylate having a $C_6$ to $C_{10}$ alkyl group,
  (ii) 40 to 0% by weight of a copolymerizable monomer therewith,
  (iii) 0 to 3 parts by mole, based on 100 parts by mole of the total of the components (i) and (ii), of a crosslinking agent and
  (iv) 0.01 to 3 parts by mole, based on 100 parts by mole of the total of the components (i) and (ii), of a graftlinking monomer, and
said monomer mixture (2) comprising:

(a) 40 to 100% by weight of an alkyl methacrylate having a $C_1$ to $C_6$ alkyl group, (b) 0 to 60% by weight of at least one monomer selected from the group consisting of an aromatic vinyl compound, an alkyl acrylate having a $C_1$ to $C_8$ alkyl group and an unsaturated nitrile compound, and (c) 0 to 30% by weight of a copolymerizable monomer with them;

said graft-copolymer (B) being graft-polymerized said monomer mixture (2) onto said rubber polymer (1).

DETAILED DESCRIPTION

Figure 1:
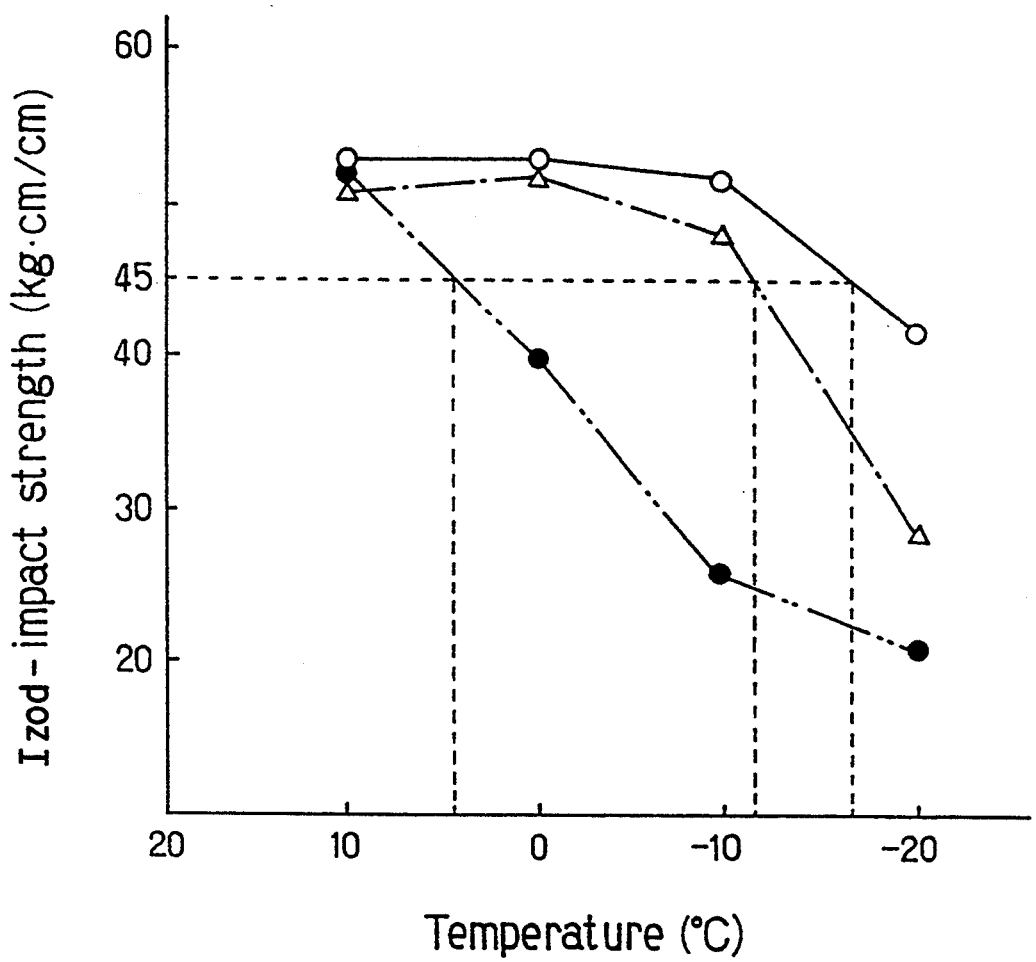
FIG. 1 is a graph showing a relationship between an Izod-impact strength V-notched concerning a ¼ inch bar and a measuring temperature.

The resin composition of the present invention can be obtained by mixing the graft-copolymer (B) prepared by graft-polymerizing the monomer mixture (2) comprising the alkyl methacrylate as the main component onto the rubber polymer (1) comprising mainly the alkyl acrylate having excellent thermal stability and weatherability with the polycarbonate resin (A).

In the present invention, it has first been found that when the alkyl acrylate having the $C_6$ to $C_{10}$ alkyl group is used, the B-D transition temperature can be remarkably improved compared to the composition using the alkyl acrylate having the alkyl group with 5 or less carbon atoms, which has hitherto been widely used, particularly n-butyl acrylate. That is, when the alkyl acrylate having the $C_6$ to $C_{10}$ alkyl group is used, though the improvement of the impact strength at room temperature, which is a usual problem to be solved, is not so remarkably exhibited, the impact strength at low temperature, which has recently grown into an important matter, can be remarkably improved.

Further, in the present invention, it has also found that it is very important to make the amounts of the used crosslinking agent (iii) and the used graftlinking monomer (iv) small for bringing out the low temperature property from the alkyl acrylate and making the B-D transition temperature small.

That is, in the present invention, it is essential that the amounts of the component (iii) and the component (iv) are set at not more than 3 parts by mole, respectively. When each of the amounts is more than 3 parts by weight, the B-D transition temperature can be insufficiently improved even if using the alkyl acrylate having the $C_6$ to $C_{10}$ alkyl group.

In the composition wherein the graft-copolymer prepared by graft polymerizing the monomer mixture comprising the alkyl methacrylate as the main component on the rubber polymer comprising the alkyl acrylate having the excellent thermal stability and weatherability is mixed with the polycarbonate resin, when the alkyl acrylate having the $C_6$ to $C_{10}$ alkyl group is used and the amounts of the crosslinking agent and the graftlinking monomer are respectively set at not more than 3 parts by mole, the B-D transition temperature is remarkably improved, as a result, the polycarbonate resin composition which is excellent in all of the thermal stability, the weatherability and the impact resistance at low temperature can be obtained.

The resin composition of the present invention is obtained by mixing the polycarbonate resin (A) with the graft-copolymer (B).

The polycarbonate resin (A) can be obtained by reacting a bis(hydroxyaryl)alkane such as 2,2-bis(4'-hydroxyphenyl)propane with a carbonic diester such as diphenyl carbonate or phosgene.

The graft-copolymer (B) is obtained by graft-polymerizing the monomer mixture (2) on the rubber polymer (1).

The rubber polymer (1) is obtained by copolymerizing (i) 60 to 100% by weight, preferably from 70 to 100% by weight, of the alkyl acrylate having the $C_6$ to $C_{10}$ alkyl group, (ii) 40 to 0% by weight, preferably from 30 to 0% by weight, more preferably from 20 to 0% by weight, of the copolymerizable monomer therewith, (iii) 0 to 3 parts by mole, preferably from 0 to 2.5 parts by mole, based on 100 parts by mole of the total of the components (i) and (ii), of the crosslinking agent and (iv) 0.01 to 3 parts by mole, preferably from 0.01 to 2.5 parts by mole, based on 100 parts by mole of the total of the components (i) and (ii), of the graftlinking monomer.

As the alkyl acrylate component (i), the alkyl acrylate having the alkyl group with 6 to 10 carbon atoms is used. If the alkyl acrylate having the alkyl group with 5 or less carbon atoms or the alkyl acrylate having the alkyl group with 11 or more carbon atoms is used, the satisfactorily low B-D transition temperature cannot be obtained. Examples of the alkyl acrylates (i) are, for instance, n-hexyl acrylate, n-heptyl acrylate, n-octyl acrylate, 6-methylheptyl acrylate, 2-ethylhexyl acrylate, n-nonyl acrylate, 7-methyloctyl acrylate, n-decyl acrylate, 8-methylnonyl acrylate, and the like. Among them, the alkyl acrylates having the $C_8$ alkyl group are preferable. More preferably, there are n-octyl acrylate, 6-methylheptyl acrylate and 2-ethylhexyl acrylate. The alkyl acrylate (i) may be used alone or as a mixture thereof.

The alkyl acrylate (i) can be replaced by the monomer (ii) copolymerizable with the alkyl acrylate (i) in an amount of not more than 40% by weight, preferably not more than 30% by weight, more preferably not more than 20% by weight. Examples of the copolymerizable monomers (ii) are, for instance, alkyl acrylate having an alkyl group with 5 or less carbon atoms or 11 or more carbon atoms, acrylic esters other than the alkyl ester, acrylic acid, metal salts of acrylic acid, acrylamide, N-substituted acrylamides, alkyl methacrylates, methacrylic acid, metal salts of methacrylic acid, methacrylamide, N-substituted methacrylamides, aromatic vinyl compounds, their derivatives, acrylonitrile, methacrylonitrile, vinyl ether compounds, vinyl ester compounds, halogenated vinyl compounds, halogenated vinylidene compounds, 1,3-butadiene, isoprene, and the like. The copolymerizable monomer (ii) may be used alone or as a mixture thereof.

The crosslinking agent (iii) includes a crosslinking monomer and/or a crosslinking intermediate. The term "crosslinking agent" used herein means an agent having two or more functional groups, each functional group being the same in reactivity as the others. Examples of the crosslinking monomers are, for instance, divinyl benzene, 1,3-butylenedimethacrylate, and the like. Examples of the crosslinking intermediates are, for instance, polyethylene glycol dimethacrylate, polyethylene glycol diacrylate, and the like. The compounds included in the crosslinking intermediate are trimers or polymers of four or more monomers. The crosslinking agent (iii) may be used alone or as a mixture thereof.

The term "graftlinking monomer" used herein means a monomer having two or more functional groups, at least one functional group being different in reactivity from the others. Examples of the graftlinking monomers (iv) are, for instance, allyl methacrylate, allyl acrylate, diallyphthalate, and the like. The graftlinking monomers (iv) may be used alone or as a mixture thereof.

The amount of the crosslinking agent (iii) is from 0 to 3 parts by mole, based on 100 parts by mole of the total of the components (i) and (ii), preferably from 0 to 2.5 parts by mole. Also, the amount of the graftlinking monomer (iv) is from 0.01 to 3 parts by mole, based on 100 parts by mole of the total of the components (i) and (ii), preferably from 0.01 to 2.5 parts by mole. It is particularly important that the amounts of the components (iii) and (iv) are adjusted to the above-mentioned ranges, for making the B-D transition temperature low. If the graft-copolymer prepared from the rubber polymer obtained by using more than 3 parts by mole of the crosslinking agent and/or graftlinking monomer is mixed with the polycarbonate resin, it is difficult to obtain the resin composition having the low B-D transition temperature. Also, it is preferable that the amounts of the components (iii) and (iv) are made as small as possible so long as the other properties are not lowered. The excellent low temperature property which is the original property of the alkyl acrylate can be exhibited by making the amounts small. Further, it is more preferable that the crosslinking agent (iii) is not used and the graftlinking monomer (iv) is used alone. On the other hand, when the amount of the component (iv) is less than 0.01 part by mole, the effect obtained by using the graftlinking monomer (iv) cannot be exhibited.

In the present invention, as the monomer mixture (2) to be graft-polymerized onto the rubber polymer (1), the monomer mixture comprising (a) 40 to 100% by weight, preferably from 50 to 100% by weight, of the alkyl methacrylate having the $C_1$ to $C_6$ alkyl group, (b) 60 to 0% by weight, preferably from 50 to 0% by weight, of at least one monomer selected from the group consisting of the aromatic vinyl compounds, the alkyl acrylates having the $C_1$ to $C_8$ alkyl group and the unsaturated nitrile compounds, and (c) 0 to 30% by weight, preferably from 0 to 20% by weight, of the other monomer copolymerizable with the alkyl methacrylate (a) and the monomer (b).

When the amount of the alkyl methacrylate (a) is less than 40% by weight, or when the amounts of the monomer (b) and the monomer (c) are more than 60% by weight and 30% by weight respectively, the composition of the polycarbonate resin (A) mixed with the thus obtained rubber polymer is insufficient in impact strength at low temperature and thermal stability.

Examples of the alkyl methacrylates (a) having the $C_1$ to $C_6$ alkyl group are, for instance, methyl methacrylate, butyl methacrylate, and the like.

Examples of the aromatic vinyl compounds are, for instance, styrene, α-methylstyrene, and the like. Examples of the alkyl acrylates having the $C_1$ to $C_8$ alkyl group are, for instance, ethyl acrylate, butyl acrylate, and the like. Examples of the unsaturated nitrile compounds are, for instance, acrylonitrile, methacrylonitrile, and the like.

Examples of the copolymerizable monomers (c) are, for instance, alkyl methacrylate having an alkyl group with 7 or more carbon atoms, methacrylic esters other than the alkyl esters, methacrylic acid, metal salts of methacrylic acid, methacrylamide, N-substituted methacrylamide, alkyl acrylates having an alkyl group with 9 or more carbon atoms, acrylic esters other than the alkyl esters, acrylic acid, metal salts of acrylic acid, acrylamide, N-substituted acrylamide, vinyl ether compounds, vinyl ester compounds, halogenated vinyl compounds, halogenated vinylidene compounds, maleimide, N-substituted maleimide, and the like. The monomer (c) may be used alone or as a mixture thereof.

Among them, there are most preferably methyl methacrylate as the alkyl methacrylate (a) and styrene as the monomer (b), for improving the thermal stability and the impact strength at low temperature.

The graft-copolymer (B) is prepared by graft-polymerizing 50 to 15 parts by weight of the monomer mixture (2) onto 50 to 85 parts by weight of the rubber polymer (1), the total amount of the components (1) and (2) being 100 parts by weight, preferably graft-polymerizing 40 to 15 parts by weight of the monomer mixture (2) onto 60 to 85 parts by weight of the rubber polymer (1), in a usual emulsion polymerization to give a latex of the graft-copolymer (B). The obtained latex is spray-dried or after subjecting to salting-out or coagulating by an acid, it is filtered, washed and dried to give the desired graft-copolymer (B). During coagulation, an antioxidant or a ultraviolet stabilizer can be added.

When the amount of the rubber polymer (1) is less than 50 parts by weight, the impact strength at low temperature is insufficiently exhibited. On the other hand, when the amount is more than 85 parts by weight, it tends to obtain the graft-copolymer (B) in the state of a mass, so it is difficult to uniformly mix the graft-copolymer (B) with the polycarbonate resin (A). In the present invention, it is preferably to use the particles of the graft-copolymer (B) having a particle size of about 1000 Å to 5000 Å.

The resin composition of the present invention can be obtained by mixing the graft-copolymer (B) with the polycarbonate resin (A). The mixing ratio of (A) to (B) depends on the use of the resin composition. In the present invention, 50 to 1% by weight, preferably from 40 to 3% by weight, of the graft-copolymer (B) is mixed with 50 to 99% by weight, preferably 60 to 97% by weight, of the polycarbonate resin (A). When the amount of the graft-copolymer (B) is more than 50% by weight, excellent properties of the polycarbonate resin disappear. On the other hand, when the amount of the graft-copolymer (B) is less than 1% by weight, the effect obtained by using the graft-copolymer (B) is not exhibited.

A mixing method of the polycarbonate resin (A) and the graft-copolymer (B) is not particularly limited, and known methods such as extrusion and roll-kneading method can be adopted.

The present invention is more specifically described and explained by means of the following Examples in which all % and part are by weight unless otherwise noted. It is to be understood that the present invention is not limited to the Examples and various changes and modifications may be made in the present invention without departing from the spirit and scope thereof.

EXAMPLE 1

[I] Preparation of a seed used in preparation of a rubber polymer (1)

A glass reactor was charged with a monomer mixture [I] as shown below.

| Monomer mixture [I] | |
| --- | --- |
| Distilled water | 250 parts |
| Potassium rhodinate | 0.5 part |
| Sodium oleate | 0.5 part |
| Formaldehyde polycondensate of naphthalenesulfonate (commercially available from Kato Atlas Kabushiki Kaisha under the trademark "Demol N") | 0.2 part |
| Sodium formaldehyde sulfoxylate (SFS) | 0.2 part |
| $Na_3PO_4.12H_2O$ | 0.45 part |
| EDTA.2Na | 0.008 part |
| Ferrous sulfate.$7H_2O$ | 0.002 part |

The temperature of the reactor was elevated to 40° C. in an atmosphere of nitrogen with stirring, then 5% of a monomer mixture of 100 parts of n-octyl acrylate, 0.5 part of allyl methacrylate and 0.2 part of cumene hydroperoxide was added to the reactor. Then, 95% of the remaining monomer mixture was added dropwise to the reactor over 4 hours. After the completion of the addition, the post-polymerization was conducted over 1.5 hours to complete the polymerization. The yield of the obtained rubber latex was 97% and the average particle size was 900 Å.

[II] Preparation of a rubber copolymer (1)

Seed polymerization was conducted, using the rubber latex obtained in the reaction (I) as seeds.

That is, a glass reactor was charged with a monomer mixture (II) as shown below.

| Monomer mixture [II] | |
| --- | --- |
| Distilled water | 250 parts |
| Rubber latex obtained in reaction (I) | 10 parts (solid matter) |
| Demol N | 0.2 part |
| EDTA.2Na | 0.008 part |
| Ferrous sulfate.$7H_2O$ | 0.002 part |

The temperature of the reactor was elevated to 40° C. in an atmosphere of nitrogen with stirring, then a monomer mixture of 90 parts of n-octyl acrylate, 0.45 part of allyl methacrylate and 0.2 part of cumene hydroperoxide was continuously added to the reactor over 4 hours, simultaneously with addition of 20 parts of a 5% aqueous solution of sodium oleate over 4 hours. After completion of the addition, 0.05 part of cumene hydroperoxide was added to the reactor, and the post-polymerization was conducted for 2 hours to give a rubber latex in a conversion of 97%. An average particle size of the latex was 2000 Å.

[III] Preparation of a graft-copolymer (B)

A glass reactor was charged with a monomer mixture [III] as shown below.

| Monomer mixture [III] | |
| --- | --- |
| Rubber latex obtained in the reaction (II) | 70 parts (solid matter) |
| Demol N | 0.2 part |
| EDTA.2Na | 0.004 part |
| Ferrous sulfate.$7H_2O$ | 0.001 part |

The temperature of the reactor was elevated to 45° C. in an atmosphere of nitrogen with stirring, then a monomer mixture of 21 parts of methyl methacrylate, 9 parts of styrene and 0.2 part of cumene hydroperoxide was continuously added to the reactor over 3 hours. After completing the addition, 0.05 part of cumene hydroperoxide was added to the reactor, and the post-polymerization was conducted over 2 hours to give a graft-copolymer latex in a conversion of 97%. The graft-copolymer latex was subjected to salting-out, dehydrated and dried to give a graft-copolymer (B).

Then, a mixture of 90% of a polycarbonate resin (commercially available from Teijin Kasei Kabushiki Kaisha under a trade mark "L-1250") and 10% of the graft-copolymer (B) obtained in the reaction [III], and 1.0 part, based on 100 parts of the mixture of the polycarbonate resin and L-1250, of a phosphorus stabilizer (commercially available from Nissan Ferro Organic Chemistry Co., Ltd. under the trademark "Ferro-904") was kneaded and extruded at a resin temperature of 270° C. by using a vent-type twin-screw extruder (40 m/m, L/D=28) to give pellets. After drying the pellets at 120° C. for 2 hours, injection molding was conducted to give a sample for testing the impact strength (¼ inch bar and ⅛ inch bar, respectively).

Figure 2:
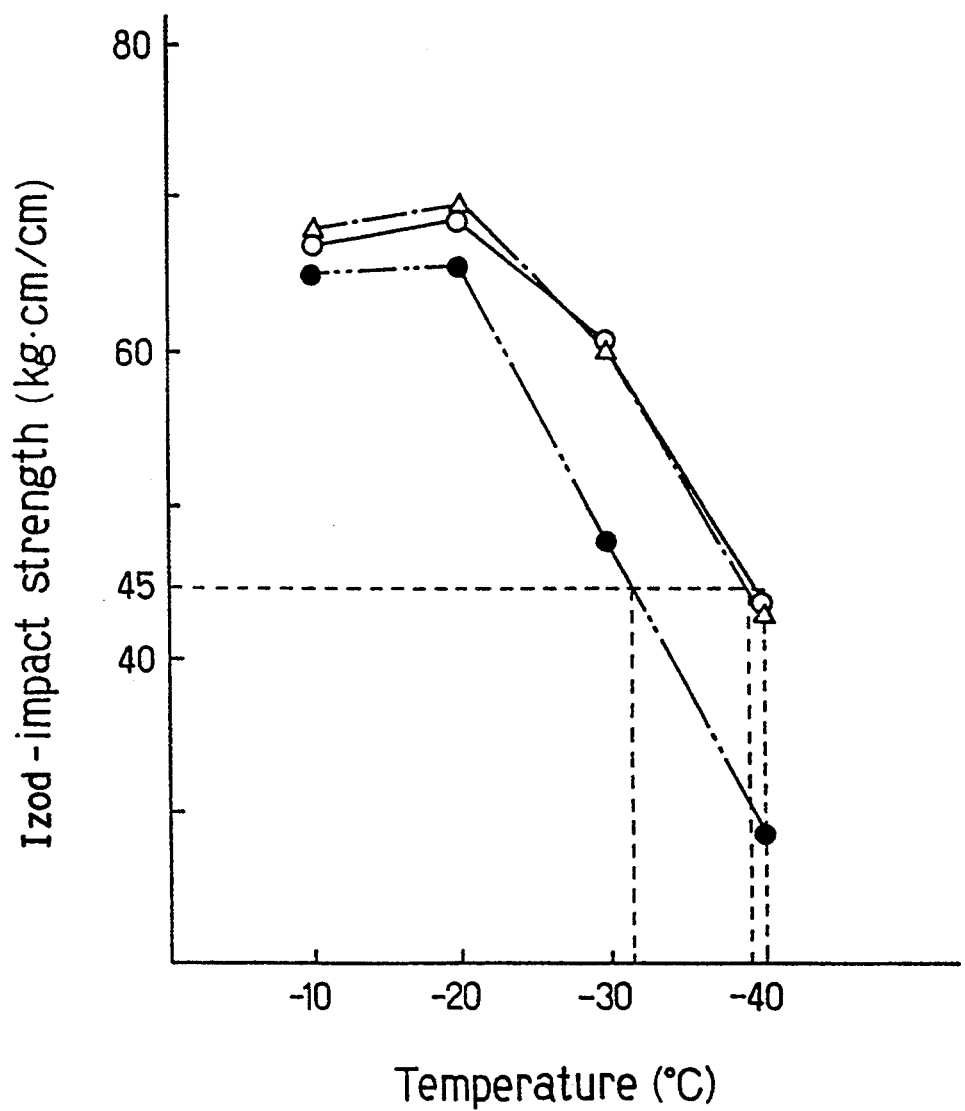
FIG. 2 is a graph showing a relationship between an Izod-impact strength V-notched concerning a ⅛ inch bar and a measuring temperature.

The Izod impact strength V-notched was measured according to JIS K 7110, using the ¼ inch bar and the ⅛ inch bar respectively, while changing the measuring temperature. FIGS. 1 and 2 are graphs showing the measuring temperature entered to the horizontal axis in the rectangular coordinate and the Izod impact strength (kg.cm/cm) entered to the vertical axis, respectively. FIG. 1 shows the results of the Izod impact strength V-notched with respect to the ¼ inch bar and FIG. 2 shows the results of the Izod impact strength V-notched with respect to the ⅛ inch bar.

From FIGS. 1 and 2, a temperature at which the Izod impact strength is changed from 45 kg cm/cm to a smaller strength than 45 kgcm/cm was decided as the B-D transition temperature. The results are shown in Table 1. Abbreviations in Tables 1 to 3 and FIGS. 1 and 2 are as follows.

BA: n-Butyl acrylate
OA: n-Octyl acrylate
2-EHA: 2-Ethylhexyl acrylate
LA: n-lauryl acrylate
ALMA: Allyl methacrylate
DAP: Diallyl phtharate

EXAMPLE 2 AND COMPARATIVE EXAMPLES 1 AND 2

A graft-copolymer (B) was prepared in the same manner as in Example 1 except that an alkyl acrylate shown in Table 1 was used instead of n-octyl acrylate.

Samples for testing the Izod impact strength were prepared in the same manner as in Example 1. Then, the Izod impact strength was measured and the same graphs as FIGS. 1 and 2 were made from the results. From the graphs, the B-D transition temperature was decided in the same manner as in Example 1.

The results are shown in Table 1.

TABLE 1

| Ex. No. | Rubber polymer Alkyl acrylate Kind | Rubber polymer Alkyl acrylate Amount (part) | Rubber polymer Graftlinking monomer Kind | Rubber polymer Graftlinking monomer Amount (part) | Rubber polymer Graftlinking monomer Amount (part by mole) | Izod impact strength (kg · cm/cm) ¼ inch bar Temperature (°C.) 23 | 10 | 0 | −10 | −20 | Izod impact strength (kg · cm/cm) ⅛ inch bar Temperature (°C.) 23 | −10 | −20 | −30 | −40 | B-D transition temperature (°C.) ¼ inch bar | B-D transition temperature (°C.) ⅛ inch bar |
|---|---|---|---|---|---|---|---|---|---|---|---|---|---|---|---|---|---|
| Ex. 1 | OA | 70 | AIMA | 0.35 | 0.73 | 66 | 53 | 53 | 51 | 42 | 69 | 67 | 69 | 61 | 44 | −16 | −40 |
| Ex. 2 | 2-EHA | 70 | AIMA | 0.35 | 0.73 | 67 | 51 | 52 | 48 | 29 | 74 | 68 | 70 | 60 | 43 | −12 | −39 |
| Com. Ex. 1 | BA | 70 | AIMA | 0.35 | 0.51 | 73 | 52 | 40 | 26 | 21 | 74 | 65 | 66 | 48 | 29 | 6 | −31 |
| Com. Ex 2 | LA | 70 | AIMA | 0.35 | 0.95 | 31 | 27 | 15 | | | 61 | 24 | 10 | | | >23 | >−10 |

From Table 1, it would be recognized that though the resin compositions wherein the polycarbonate resin (A) is admixed with the graft-copolymer (B) prepared, using the alkyl acrylate having $C_8$ alkyl group, namely n-octyl acrylate (Ex. 1) or 2-ethylhexyl acrylate (Ex. 2) are not so greatly different in impact strength at room temperature from the resin composition wherein the polycarbonate resin admixed with the graft-copolymer prepared, using the $C_4$ alkyl acrylate, namely n-butyl acrylate (Com. Ex. 1), the B-D transition temperature of the compositions of Exs. 1 and 2 become remarkably low compared to the composition of Com. Ex. 1. In other words, the compositions of the present invention are remarkably improved in impact strength at low temperature. Also, it would be recognized that when using the $C_{12}$ alkyl acrylate, namely lauryl acrylate, sufficient impact strength at low temperature cannot be obtained.

EXAMPLES 3 TO 5 AND COMPARATIVE EXAMPLES 3 AND 4

A graft copolymer was prepared in the same manner as in Example 1 except that an alkyl acrylate and a graftlinking monomer shown in Table 1 respectively were used.

Then, samples for testing Izod impact strength was prepared, and the B-D transition temperature was decided in the same manner as in Example 1. The results are shown in Table 2.

TABLE 2

| Ex. No. | Rubber polymer Alkyl acrylate Kind | Rubber polymer Alkyl acrylate Amount (part) | Rubber polymer Graftlinking monomer Kind | Rubber polymer Graftlinking monomer Amount (part) | Rubber polymer Graftlinking monomer Amount (part by mole) | Izod impact strength (kg · cm/cm) ¼ inch bar Temperature (°C.) 23 | 10 | 0 | −10 | −20 | Izod impact strength (kg · cm/cm) ⅛ inch bar Temperature (°C.) 23 | −10 | −20 | −30 | −40 | B-D transition temperature (°C.) ¼ inch bar | B-D transition temperature (°C.) ⅛ inch bar |
|---|---|---|---|---|---|---|---|---|---|---|---|---|---|---|---|---|---|
| Ex. 3 | OA | 70 | AIMA | 0.70 | 1.46 | 64 | 46 | 47 | 36 | 25 | 70 | 56 | 54 | 48 | 38 | −4 | −33 |
| Ex. 4 | 2-EHA | 70 | AIMA | 0.70 | 1.46 | 69 | 45 | 48 | 30 | 29 | 79 | 66 | 48 | 50 | 36 | −2 | −34 |
| Ex. 5 | 2-EHA | 70 | DAP | 1.40 | 1.50 | 68 | 52 | 51 | 49 | 30 | 74 | 69 | 67 | 61 | 42 | −13 | −39 |
| Com. Ex. 3 | OA | 70 | AIMA | 2.10 | 4.38 | | 38 | 31 | 21 | 12 | | 47 | 44 | 25 | 21 | >10 | −10 |
| Com. Ex. 4 | 2-EHA | 70 | AIMA | 2.10 | 4.38 | | 37 | 16 | 20 | 15 | | 47 | 30 | 20 | 9 | >10 | −11 |

As shown in Table 2, even if using the $C_8$ alkyl acrylate, when the amount of the graftlinking monomer (iv) is more than 3% by mole, the B-D transition temperature is remarkably shifted to a high temperature (Com. Exs. 3 and 4). From the results, it would be recognized that for obtaining the low B-D is transition temperature, it is important to control the amount of the graftlinking monomer (iv) to a low value.

EXAMPLES 6 TO 9 AND COMPARATIVE EXAMPLES 5 AND 6

A graft-copolymer was prepared in the same manner as in Example 1 except that an alkyl acrylate and a graftlinking monomer shown in Table 3 were used in amounts shown in Table 3, respectively.

Samples for testing Izod impact strength was prepared in the same manner as in Example 1. The Izod impact strength was measured and the B-D transition temperature was decided in the same manner as in Example 1. The results are shown in Table 3.

TABLE 3

| Ex. No. | Rubber polymer (part) Alkyl acrylate OA | 2-EHA | BA | Rubber polymer (part) Graftlinking monomer AIMA | Monomer component (2) (part) MMA | ST | BA | AN | B-D transition temperature ¼ inch bar | B-D transition temperature ⅛ inch bar |
|---|---|---|---|---|---|---|---|---|---|---|
| Ex. 6 | 70 | — | — | 0.35 | 27 | — | 3 | — | −14° C. | −37° C. |
| Ex. 7 | 70 | — | — | 0.35 | 24 | — | — | 6 | −12° C. | −35° C. |
| Ex. 8 | — | 70 | — | 0.35 | 27 | — | 3 | — | −11° C. | −36° C. |
| Ex. 9 | 35 | 35 | — | 0.35 | 21 | 9 | — | — | −14° C. | −39° C. |
| Com. Ex. 5 | — | — | 70 | 0.35 | 24 | — | — | 6 | 8° C. | −25° C. |
| Com. Ex. 6 | 10 | — | 60 | 0.35 | 21 | 9 | — | — | 2° C. | −32° C. |

(Notes)
MMA: Methyl methacrylate
ST: Styrene
AN: Acrylonitrile

Although, in Example 1, methyl methacrylate was used as the component (a) and styrene was used as the component (b) in the monomer mixture (2), other suitable monomers can be replaced so long as the mixture comprises the $C_1$ to $C_6$ alkyl methacrylate (a) as the main component and is compatible with the polycarbonate resin.

As mentioned above, the resin composition of the present invention is excellent in physical properties such as impact strength at low temperature showing by the B-D transition temperature.

In addition to the ingredients used in the Examples, other ingredients can be used in the Examples as set forth in the specification to obtain substantially the same results.

What we claim is:

1. A resin composition comprising:
   (A) 50 to 99% by weight of a polycarbonate resin and
   (B) 50 to 1% by weight of a graft-copolymer;
   said graft-copolymer (B) consisting of:
   (1) 50 to 85 parts by weight of a rubber polymer and
   (2) 50 to 15 parts by weight of a monomer mixture, the total amount of the components (1) and (2) being 100 parts by weight,
   said rubber polymer (1) being prepared from and consisting of
   (i) 60 to 100% by weight of an alkyl acrylate having a $C_6$ to $C_{10}$ alkyl group,
   (ii) 40 to 0% by weight of a copolymerizable monomer therewith, said copolymerizable monomer being at least one member selected from the group consisting of an alkyl acrylate having an alkyl group with 5 or less carbon atoms or 11 or more carbon atoms, an acrylic acid ester other than alkyl acrylates, acrylic acid, a metal salt of acrylic acid, acrylamide, an N-substituted acrylamide, an alkyl methacrylate, methacrylic acid, a metal salt of methacrylic acid, methacrylamide, an N-substituted methacrylamide, acrylonitrile, methacrylonitrile, a vinyl ether compound, a vinyl ester compound, a halogenated vinyl compound, a halogenated vinylidene compound, 1,3-butadiene and isopropene, and
   (iii) 0.01 to 3 parts by mole, based on 100 parts by mole of the total of the components (i) and (ii), of a graftlinking monomer having at least two functional groups, at least one of which has a different reactivity from that of the other in the absence of a crosslinking agent having at least two functional groups of the same reactivity, and
   said monomer mixture (2) comprising:
   (a) 40 to 100% by weight of an alkyl methacrylate having a $C_1$ to $C_6$ alkyl group,
   (b) 0 to 60% by weight of at least one monomer selected from the group consisting of an aromatic vinyl compound, an alkyl acrylate having a $C_1$ to $C_8$ alkyl group and an unsaturated nitrile compound, and
   (c) 0 to 30% by weight of a copolymerizable monomer with them;
   said graft-copolymer (B) being prepared by graft-polymerizing said monomer mixture (2) onto said rubber polymer (1).

2. The composition of claim 1, wherein said alkyl acrylate (i) has a $C_8$ alkyl group.

3. The composition of claim 2, wherein said alkyl group is n-octyl group, 6-methylheptyl group or 2-ethylhexyl group.

4. The composition of claim 1, wherein the amount of said graftlinking monomer is from 0.01 to 2.5 parts by mole per 100 parts by mole of the total of the components (i) and (ii).

5. The composition of claim 1, wherein said graftlinking monomer is at least one member selected from the group consisting of allyl methacrylate, allyl acrylate and diallyl phthalate.

* * * * *